April 8, 1930.    H. SRULOWITZ    1,754,127
PIPE COUPLING
Filed Oct. 1, 1925
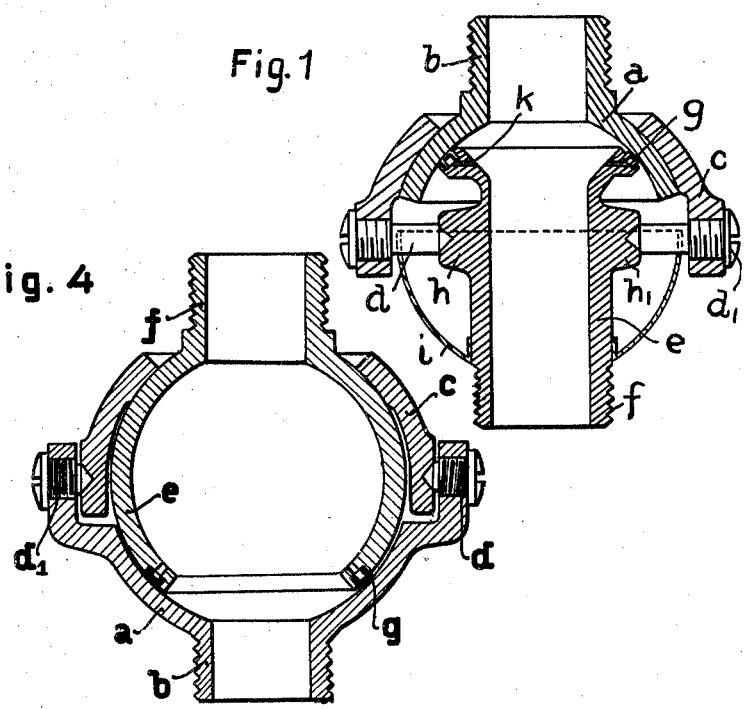
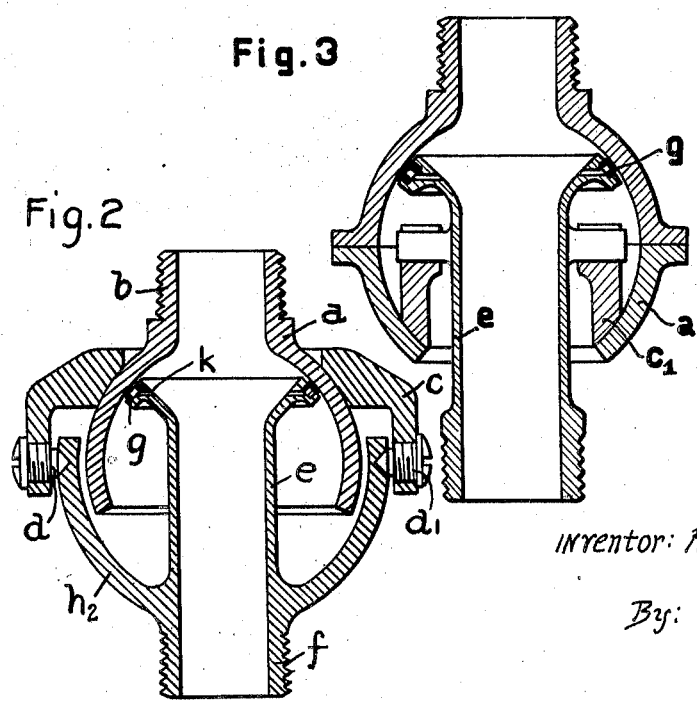
INVENTOR: Hermann Srulowitz
By: Mankes & Clark
Attys Patented Apr. 8, 1930

1,754,127

UNITED STATES PATENT OFFICE

HERMANN SRULOWITZ, OF VIENNA, AUSTRIA, ASSIGNOR TO THE FIRM OF ALEX. FRIEDMANN, OF VIENNA, AUSTRIA

PIPE COUPLING

Application filed October 1, 1925, Serial No. 59,925, and in Austria October 20, 1924.

Pipe couplings for railway cars require when they are in two parts at least four joints; when they are in one part at least three joints. It is obviously advisable to employ as few joints as possible in the coupling and to provide a straight passageway through these joints.

Uniaxial swivel joints cannot, however, comply with all these requirements due to the relative movements in all directions of two coupled wagons, a ball and socket joint must be provided at at least two places on the coupling, but since the principal movement is in the plane of the coupling and the movements in other directions are of less amplitude, it is sufficient if the ball and socket joints are adapted for only small deflections and if three or four swivel joints are provided in additon.

The present invention consists in a uniaxial swivel joint with a straight passageway and spherical rubbing surfaces capable of acting also as a ball and socket joint which is most simple and effective and has the least possible number of parts and allows larger deflections than any of the joints hitherto known. This object is attained by making one of the joint members in two parts connected by pivots or similar means for effecting a pivotal connection and by providing one of said parts with spherical sealing means, the other with a spherical bearing surface, while the other joint member is provided both with the corresponding sealing means and bearing surface, so as to obtain with the least number of parts both a uniaxial movement and an all round movement, while keeping up a tight seal between the parts. This double range of relative movement can be utilized with great advantage in a pipe or hose coupling between railway cars as the relative movements between such cars are of two different kinds.

One group of movements occurs in longitudinal direction with respect to the track whenever the train changes its speed and is a very frequent one. The other group of movements occurs in a transversal direction and is by far less frequent, being due to curves or switches in the track. If therefore the composite member is connected with the hose or pipe, while the other member is fixed to the car, the pivots will always be in the plane passing through the coupling and the relative movements between the cars of the first group will always be taken up by the pivots, which allow very easy movement approximately without friction, while only the second class of movements which are unfrequent and limited has to be taken up by the ball bearing surfaces.

Thus the advantage of the uniaxial joint, to allow a very easy movement between the parts without wear can be utilized for the principal and most frequent movements of the coupling in all positions of the joints.

The accompanying drawings show examples of joints according to the invention.

Fig. 1 shows one modification according to this invention in section with two joint members one of which consists of two parts connected directly by pivots while the other member has a spherical enlargement, the outer face of the sphere being adapted to act as a bearing surface while the inner surface of the sphere acts as a sealing surface for the packing ring rubbing against it.

Fig. 2 shows a similar modification adapted for larger deflections in which the inner part of the composite member is provided with spherical ribs for carrying the pivots.

Fig. 3 shows another modification in which the inner spherical surface of one joint member acts as a sealing surface and as a bearing surface.

Fig. 4 shows still another modification in which the composite member has a spherical sealing surface, while the other joint member carries the packing ring.

In Fig. 1 $a$ denotes one of the joint members consisting of a spherical segment provided with a nipple $b$ which is adapted to be connected with one pipe. The outer face of said spherical segment acts as bearing surface for the other joint member, while its inner surface acts as sealing surface adapted to effect a fluid tight joint with a packing ring $g$, seated in the other joint member and capable of rubbing against it to maintain fluid tightness in every position. The inner joint member is also provided with a nipple $f$ and carries the packing ring $g$. This inner member consists of two parts $e$ and $c$, which are connected by two pivots or pins $d, d_1$. The inner member $e$ is of substantially tubular shape and has two cylindrical projections $h, h_1$ in which the bearing for the pivots is lodged. $i$ is a hood which is provided for the purpose of protecting the joint against dust.

The elastic packing ring $g$ is of the inflatable kind and is constructed in such a manner as to be pressed by steam or air pressure against the inner surface of the spherical segment $a$, which acts as a spherical sealing surface. For this purpose channels $k$ are provided within the member $e$, allowing fluid under pressure to penetrate behind such packing ring.

The axis of rotation between the two parts $c, e$ of the composite joint member is arranged in such a way that it passes through the common center of the spherical bearing and sealing surfaces and that it is always perpendicular to the plane of the coupling so that the main movement in the plane of the coupling, due to longitudinal movement of the cars is an oscillation about the axis $d, d_1$ while only the small additional movements due to the lateral movements of the cars are taken up by the spherical segments $a$ and $c$.

Fig. 2 shows a modification in which, instead of the two projections $h, h'$ shown in Fig. 1, a spherical housing $h^2$ is employed which carries the two trunnion bearings. This construction is used for especially large deflections about the axis of rotation.

In the construction shown in Fig. 3 the joint member $a$ consists of two parts which together form a large spherical segment, larger than a half sphere. These two parts may be connected by flanges through which screws are passing or in any other suitable manner. Within said spherical segment the other joint member is arranged, which is also a composite member and consists of a tubular part $e$ carrying the packing ring, connected by pivots with annular support $c_1$ having a spherical bottom adapted to slide on the spherical surface of the part $a$.

The construction is in all other respects similar to that before described but in this case the inner spherical surface of the part $a$ is adapted to serve as well as a bearing surface for the support $c_1$ as a sealing surface for the packing ring.

In the construction shown in Fig. 4 the relative position of the joint members is reversed. The inner member $e$ of the joint carries at its upper part the nipple $f$ and at its lower part the packing ring $g$. The outer joint member consists of two parts $a, c$ connected by pivots and one of these parts $a$ carries the spherical sealing surface, upon which the packing ring $g$ may rub during relative movement of the joints, the other $c$ being provided with the spherical bearing surface. Said spherical bearing surface $c$ slides on the spherical outer surface of the inner member of the joint. The part of the outer joint member carrying the spherical bearing segment $c$ is connected by the pins $d\ d'$ with the other part $a$ of the outer joint member, the interior of which provides the spherical rubbing surface.

All these constructions have the common feature that one of the two members which are connected in such a way as to effect a tight seal is constructed of two parts only united by pivots and one of said parts is provided with a spherical bearing surface co-operating with a corresponding surface on the other member and all the parts are held together positively in such a way that when the packing ring is pressed against the sealing surface also the spherical part of one member is pressed against the spherical part of the other member.

By arranging the pivots in such a way that their axis can turn so as to be always substantially perpendicular to the vertical plane passing through the coupling irrespective of any relative lateral displacement of the cars it is moreover possible to take up the main movement of the cars in the longitudinal direction, while only the accidental lateral and oblique movement are taken by the ball joint, thus reducing wear and allowing a very simple construction and a very small number of joints in the coupling.

What I claim is:

1. A swivel joint with straight passageway for the pipes or hose couplings of railway cars comprising two relatively displaceable joint members, one of them being provided with a hollow sealing surface and the other with an elastic packing ring rubbing against said hollow surface to effect a tight seal between said members in every position and during displacement, one of said members consisting of two parts connected by pivots and one of said parts being provided with ball surfaces adapted to co-operate with ball surfaces on the other member, said ball faces on one member being so arranged as to retain the other member and as to hold the packing ring against the sealing surface positively.

2. In a swivel joint with straight passageway for the pipes or hose of railway cars, two members angularly displaceable relatively to each other, one of said members consisting of two parts with a pivotal connection between them, a sealing means on one part of the composite member and a spherical bearing surface on the other part of said composite member, the other non composite member co-operating with both parts of the composite member by means of a corresponding sealing means and a corresponding spherical bearing surface both arranged simultaneously on said member.

3. In a swivel joint with straight passageway for the pipes or hose of railway cars, two members capable of relative angular displacement, one of said members being provided both with a hollow spherical sealing surface and a spherical bearing surface, the other member being composite and consisting of two parts connected by pivots one of said parts carrying a packing ring adapted to rub against the hollow sealing surface on the other member and the other part having a spherical bearing surface adapted to co-operate with the bearing surface on the other member.

4. A swivel joint with straight passageway for the pipes or hose of railway cars or the like, comprising two joint members capable of relative movement, a single packing means between said members to maintain them permanently sealed against each other, both members being provided with ball shaped bearing faces adapted to glide upon each other so as to form a ball and socket joint allowing limited relative movement of said members in every direction, but one of said members consisting of two parts with pivots effecting a pivotal connection inserted between them, said pivots allowing in addition to the limited ball and socket movement of the parts a larger angular movement in one direction.

5. A swivel joint with straight passageway for the pipe or hose connecting railway cars or the like, comprising two joint members capable of relative movement, a packing ring seated on one of said members and a hollow spherical sealing surface on the other member, said packing ring rubbing against said sealing surface to maintain said members sealed against each other in every relative position, both members being provided with ball shaped bearing faces adapted to glide upon each other so as to form a ball and socket joint allowing limited relative movement of said members in every direction, but one of said members consisting of two parts with pivots effecting a pivotal connection inserted between them, said pivots allowing in addition to the limited ball and socket movement of the parts a larger angular movement in one direction.

6. A swivel joint with straight passageway for the pipe or hose couplings of railway cars or the like, comprising two members capable of relative movement, a single packing ring seated on one of said members and a sealing surface on the other member to maintain a fluid tight seal between said members in every relative position, ball shaped bearing surfaces adapted to glide upon each other so as to form a ball and socket joint allowing limited relative movement of said members in every direction, one of said members consisting of two parts, pivots effecting a pivotal connection inserted between said parts, said pivots allowing in addition to the limited ball and socket movement a large angular movement in one direction, the sealing means of the pivoted joint member being carried by one part of the same and the spherical bearing surface by the other part of the same.

7. A swivel joint with straight passageway for the pipes or hose coupling of railway cars or the like, comprising two joint members capable of relative movement and a single packing means between them to maintain a fluid tight seal between said members, in every relative position, ball shaped bearing surfaces adapted to glide upon each other so as to form a ball and socket joint allowing limited relative movement of said members in every direction, one of said members consisting of two parts, one pair of pivots effecting a pivotal connection inserted between said parts, said pivots allowing in addition to the limited ball and socket movement a large angular movement in one direction, one of said parts carrying the aforesaid bearing surface adapted to cooperate with the corresponding ball bearing surface of the other joint member, the other part, however, being fixedly mounted on the car with respect to the plane of the coupling.

In testimony whereof I affix my signature.
HERMANN SRULOWITZ.